May 27, 1958  A. T. FASSERO ET AL  2,835,922
CURING RIMS FOR TUBELESS TIRES
Filed Aug. 3, 1956  2 Sheets-Sheet 1
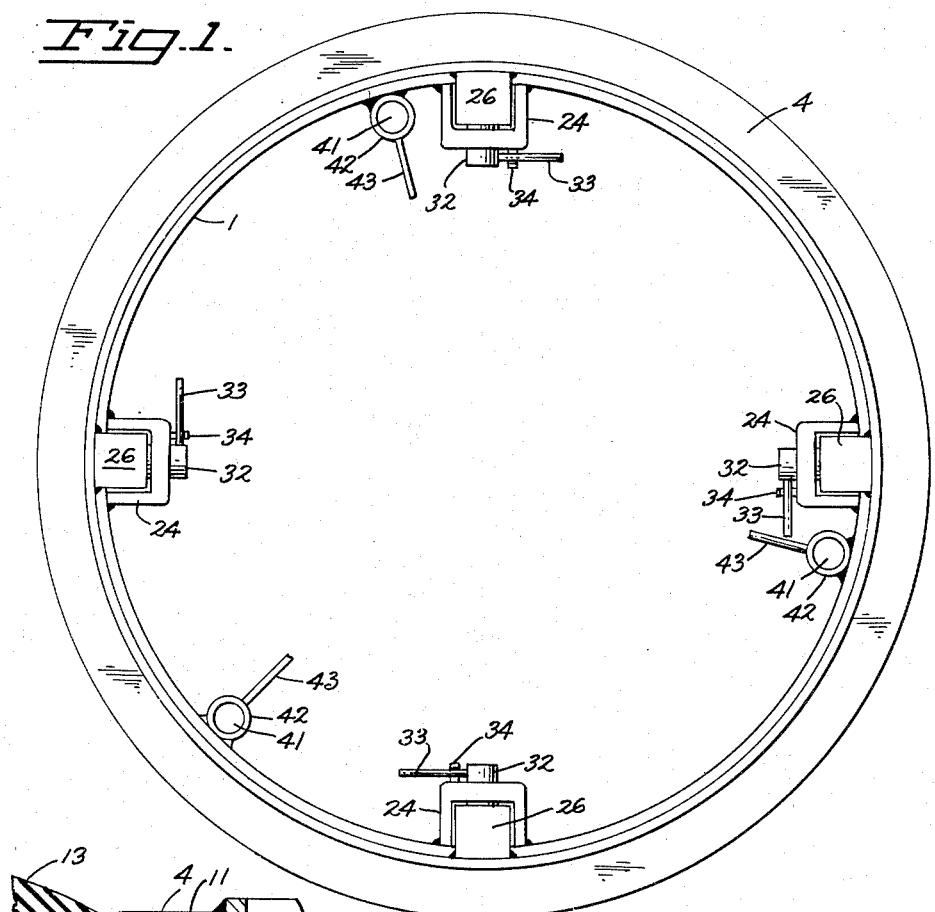
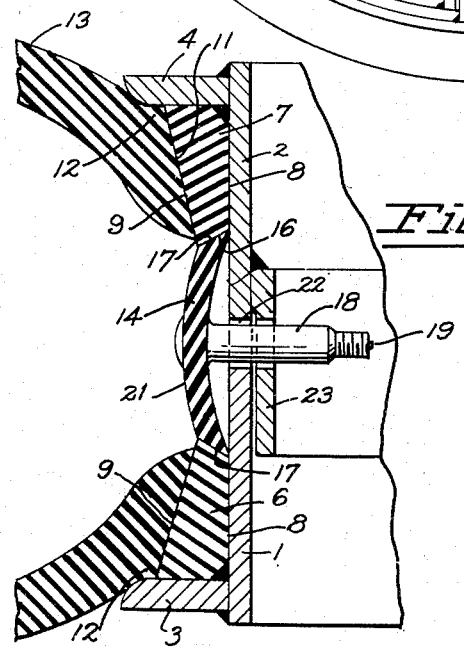
INVENTORS
ANTHONY T. FASSERO
JAMES R. MADDOX
BY
George B. White
ATTORNEY May 27, 1958    A. T. FASSERO ET AL    2,835,922
CURING RIMS FOR TUBELESS TIRES Filed Aug. 3, 1956      2 Sheets-Sheet 2

INVENTORS
ANTHONY T. FASSERO
JAMES R. MADDOX
BY George B. White
ATTORNEY

United States Patent Office 2,835,922
Patented May 27, 1958

2,835,922

CURING RIMS FOR TUBELESS TIRES

Anthony T. Fassero and James R. Maddox, Oakland, Calif.

Application August 3, 1956, Serial No. 601,914

7 Claims. (Cl. 18—18)

This invention relates to curing rim for tubeless tires.

The recapping or retreading of tubeless tires and particularly of larger tubeless truck tires presents considerable problem because of the difficulty in properly sealing the interior of the tire. While many experimental structures are utilized, the problem of proper sealing and holding pressure in such tubeless larger truck tires is not sold at the present time.

The primary object of the invention is to provide a sectional rim so padded as to automatically seal a tubeless tire by accurate and proper adjustment with the opposite beads of such tires; the said sectional rim being easily assembled or applied to the beads of the tire and upon being locked together in position, it automatically accomplishes the desired seal upon the beads in such a manner that pressure inside of the tire casing will increase the tightness of the seal instead of resulting in escape as in the past.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a plane view of the rim constructed in accordance with our invention.

Fig. 2 is a sectional view taken through lines 2—2 of Fig. 1.

Figure 3:
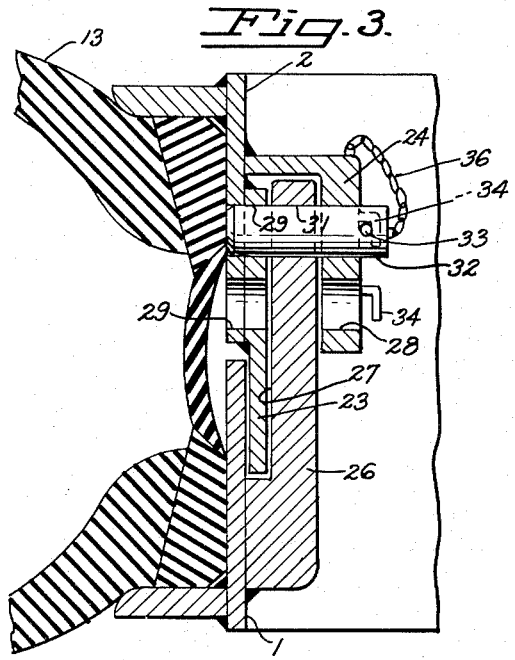
Fig. 3 is a cross-sectional view taken on the lines 3—3 of Fig. 1.

In the present rim we provide a lower curing rim section 1 and an upper rim section 2 which are complemental to one another. The outer peripheries of the rim sections 1 and 2 are generally cylindrical and are in registry with one another. From the lower section 1 extends a fixed cylindrical flange 3 outwardly generally at right angles to the respective outer periphery of the lower rim section 1. From near the outer edge of the upper rim section 2 extends also a generally cylindrical flange 4 spaced from and parallel with the first cylindrical flange 3 of the lower section 1 so as to confine generally the space for the tire on which the rim sections are to be used.

On the lower rim flange 3 rests a ring pad 6 preferably made of suitable rubber or resiliently compressible composition. Along the inner periphery of the upper rim flange 4 extends a ring pad 7 symmetrically to the lower ring pad 6. The bottom faces or inner peripheries 8 of each of the ring pads 6 and 7 are flat to rest on the outer surfaces of the rim sections 1 and 2. The outer peripheries 9 of the respective pads 6 and 7 are frustoconical so as to slant inwardly and toward the middle of the curing rim. The incline of the outer peripheries or sides 9 conforms generally to the angle of the side 11 of the usual bead 12 of a tubeless tire 13.

A central flap 14 also made of suitable resilient compound extends around the middle of the outer periphery of the curing rim so as to fill and cover the space between the ring pads 6 and 7. The ring pads 6 and 7 are undercut at edges 16 adjacent the flap 14 and the outer edges 17 of the central flap 14 are tapered in such a manner as to wedge in the space under the respective undercut edges 16 as shown.

A valve stem 18 is provided in the central flap 14 to hold a pneumatic valve 19 in the usual manner for inflating the tire 13 on the curing rim. The central flap 14 is dished transversely so that its convex side 21 forms its outer periphery. Air pressure in the tire 13 presses on said convex side 21 and tends to flatten the flap 14 so as to tighten the seal at the tapered edges 17 thereof. The stem 18 extends through suitable complemental slots 22 of the respective rim sections 6 and 7.

The free edges of the flanges 3 and 4 are rounded from the inside toward the outer peripheries of the same so as to facilitate the engagement of the rim sections with the bead 12 of the tire casing 13.

Figure 4:
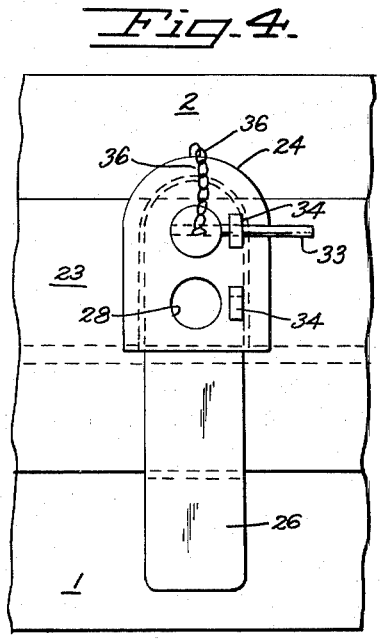
Fig. 4 is a fragmental inside view of the interlocking device of the rim sections viewing Fig. 1 in the direction of 4—4.
Figure 5:
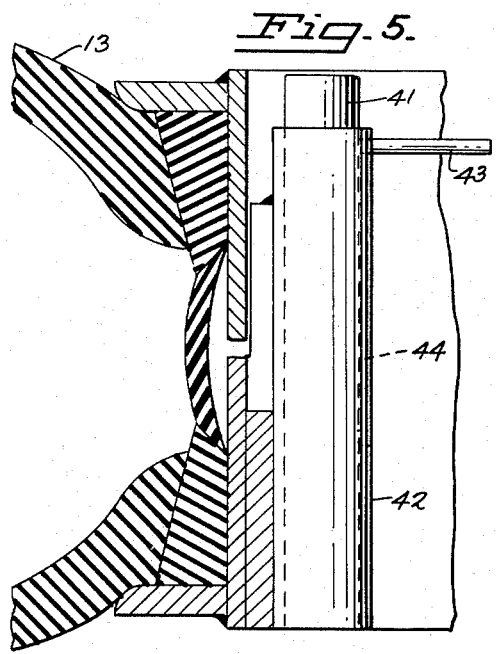
Fig. 5 is a sectional view taken through the lines 5—5 of Fig. 1.
Figure 6:
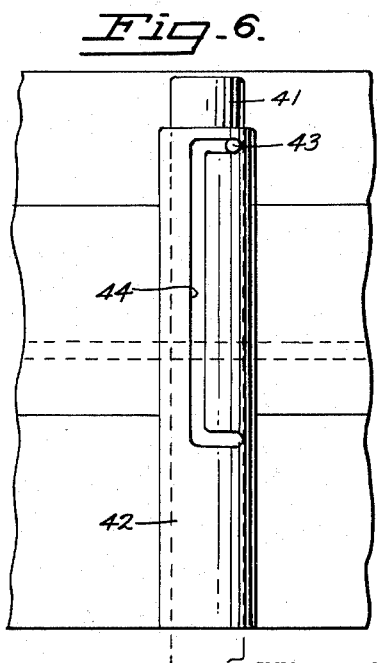
Fig. 6 is a side view of the leg arrangement for supporting the lower section of the rim.

The rim sections 1 and 2 are locked together on several, in this illustration four, diametrically opposite locks as particularly illustrated in Figs. 3 and 4. One of the rim sections in this illustration the upper rim section 2, has an overlapping skirt flange 23 provided fixedly on the inner periphery of the rim section 2 projecting so as to overlap the respective inner periphery of the lower rim section 1. The upper rim section 2 also has four circumferentially spaced yokes or clips 24 each extended from the inner periphery of the rim section 2 at right angles and then bent to parallel with and spaced from the skirt flange 23 so as to form a keeper.

From the inner periphery of the lower rim section extend four bolts 26 each of which is bent to form a socket 27 on its underside to fit over the skirt 23 of the other section. Each bolt 26 extends into and fits under one of the yokes or clips 24. Each clip 24 has a pair of holes 28 extended therethrough radially of the respective rim section. The periphery of the rim section as well as the base of the skirt 23 have registering holes 29 therethrough. In the end of each bolt 26 is a hole 31 which can be aligned with the respective pair of holes 28 and 29 selectively to accommodate a locking pin 32 for locking the rim sections 1 and 2 together. In the event of larger truck tire the hole 31 in the bolt 26 is aligned with the set of holes 28 and 29 nearer to the free end of the clip 24. On smaller width of tire casing, the alignment is as shown in Fig. 2. In order to prevent accidental removal of the locking pin 32 a transverse safety pin 33 is extended through the locking pin 32 and under a safety clip 34 extended from the inner face of the clip 24 adjacent to the respective holes 28. The safety pin 33 is preferably supported on a chain 36 anchored to the clip 24.

In order to allow the spacing of the rim sections from the floor when the rim is set up for operation, a plurality of legs or support rods 41 are telescoped into sleeves 42 fixedly secured transversely to the inner periphery of the lower rim section 1. From each leg 41 extends a handle 43 which rides in a U-shaped groove 44 on the inner side of the sleeve 42. When the handle 43 is in the upper horizontal end of the U-shaped groove or slot 44 then it holds the leg 41 in withdrawn position. When use of the leg 41 is desired then the handle 43 is bent and is slid in the slot 44 to its lower offset end so as to be in extended position. In this position the rim is supported on the legs 41 in spaced position from the ground.

In operation the lower rim section 1 is set upon the leg 41 and the central flap is either placed in position at this time or after the tire is placed on the lower rim section. The tire is then placed in the lower rim section so that its bead is in engagement with the ring pad. Then the upper ring section 2 is placed upon the tire so that its ring pad 7 engages the bead and then the two rim sections are locked together with the locking pins 32 as heretofore described. Then the legs 41 are withdrawn and the tire casing is securely held on the curing rim to be placed in a suitable mold for the curing operation.

We claim:

1. A curing rim comprising a pair of generally cylindrical rim sections, a cylindrical flange extended at right angle from each rim section so as to confine a bead holding space therebetween, a ring pad on each rim section adjacent to the said flange, a connecting flap pad between the said ring pad to cover the intermediate portion of the rim, and means to releasably lock the rim sections together.

2. A curing rim comprising a pair of generally cylindrical rim sections, a cylindrical flange extended at right angle from each rim section so as to confine a bead holding space therebetween, a ring pad on each rim section adjacent to the said flange, a connecting flap pad between the said ring pad to cover the intermediate portion of the rim, and means to releasably lock the rim sections together, each of said ring pads having frustoconical face inclined toward the middle of the rim at an angle generally corresponding to the angle of the respective periphery of the bead of the respective beads.

3. A curing rim comprising a pair of generally cylindrical rim sections, a cylindrical flange extended at right angle from each rim section so as to confine a bead holding space therebetween, a ring pad on each rim section adjacent to the said flange, a connecting flap pad between the said ring pad to cover the intermediate portion of the rim, and means to releasably lock the rim sections together, each of said ring pads having frustoconical face inclined toward the middle of the rim at an angle generally corresponding to the angle of the respective periphery of the bead of the respective beads, and said center flap being tapered at its edges and a socket formed under the inner edges of said pads to receive said tapered edges respectively.

4. A curing rim comprising a pair of generally cylindrical rim sections, a cylindrical flange extended at right angle from each rim section so as to confine a bead holding space therebetween, a ring pad on each rim section adjacent to the said flange, a connecting flap pad between the said ring pad to cover the intermediate portion of the rim and means to releasably lock the rim sections together, each of said ring pads having frustoconical face inclined toward the middle of the rim at an angle generally corresponding to the angle of the respective periphery of the bead of the respective beads, and said center flap being tapered at its edges and a socket formed under the inner edges of said pads to receive said tapered edges respectively, said center flap being transversely dished so that its convex side faces outwardly of the rim and receives sealing pressure from air pressure in the tire on said rim.

5. A curing rim comprising a pair of generally cylindrical rim sections, a cylindrical flange extended at right angle from each rim section so as to confine a bead holding space therebetween, a ring pad on each rim section adjacent to the said flange, a connecting flap pad between the said ring pad to cover the intermediate portion of the rim, and means to releasably lock the rim sections together, said pads and flap being resiliently compressible.

6. A curing rim comprising a pair of generally cylindrical rim sections, a cylindrical flange extended at right angles from each rim section so as to confine a bead holding space therebetween, a ring pad on each rim section adjacent to the said flange, a connecting flap pad between the said ring pad to cover the intermediate portion of the rim, and means to releasably lock the rim sections together, said pads and flap being resiliently compressible, said locking means including a plurality of circumferentially spaced keepers on the inner periphery of one rim section extended toward the other rim section, a plurality of bolts on the inner periphery of the other rim section being complemental to said keepers respectively, and releasable means to fasten said bolts into the respective keepers.

7. A curing rim comprising a pair of generally cylindrical rim sections, a cylindrical flange extended at right angles from each rim section so as to confine a bead holding space therebetween, a ring pad on each rim section adjacent to the said flange, a connecting flap pad between the said ring pad to cover the intermediate portion of the rim, and means to releasably lock the rim sections together, comprising circumferentially spaced leg sleeves on the inner periphery of one of said rim sections, a leg telescoped into each sleeve, and means to hold said leg selectively in concealed or extended position.

References Cited in the file of this patent

UNITED STATES PATENTS

| | | |
|---|---|---|
| 1,674,765 | Dearth | June 26, 1928 |
| 2,597,550 | Tritt | May 20, 1952 |

FOREIGN PATENTS

| | | |
|---|---|---|
| 267,567 | Great Britain | Mar. 14, 1927 |